US008721495B2

(12) United States Patent
Kitamura et al.

(10) Patent No.: US 8,721,495 B2
(45) Date of Patent: May 13, 2014

(54) REAR DERAILLEUR AND GEAR SHIFT SYSTEM

(75) Inventors: Satoshi Kitamura, Osaka (JP); Shintaro Mori, Osaka (JP)

(73) Assignee: Shimano Inc., Osaka (JP)

( * ) Notice: Subject to any disclaimer, the term of this patent is extended or adjusted under 35 U.S.C. 154(b) by 315 days.

(21) Appl. No.: 13/162,719

(22) Filed: Jun. 17, 2011

(65) Prior Publication Data
US 2012/0322591 A1    Dec. 20, 2012

(51) Int. Cl.
*H02P 1/00*    (2006.01)
*H02P 3/00*    (2006.01)
*H02P 7/00*    (2006.01)

(52) U.S. Cl.
USPC .................................. 477/7; 903/907; 474/80

(58) Field of Classification Search
USPC ...................... 477/7, 15; 474/70, 79–81, 110; 180/65.1, 65.285, 65.29, 65.31, 65.8; 903/903, 906–908
See application file for complete search history.

(56) References Cited

U.S. PATENT DOCUMENTS

| 4,950,971 | A | | 8/1990 | Hegi et al. |
| 5,470,277 | A | | 11/1995 | Romano |
| 5,480,356 | A | * | 1/1996 | Campagnolo ................... 474/70 |
| 6,204,775 | B1 | | 3/2001 | Kubacsi |
| 6,380,731 | B1 | | 4/2002 | Nishimoto |
| 7,015,598 | B2 | * | 3/2006 | Oohara ........................... 307/47 |
| 7,267,352 | B2 | * | 9/2007 | Ishikawa .................... 280/288.4 |
| 7,292,006 | B2 | * | 11/2007 | Horiuchi ........................... 322/7 |
| 7,411,307 | B2 | * | 8/2008 | Uno ............................. 290/1 R |
| 2005/0285461 | A1 | | 12/2005 | Kitamura et al. |
| 2007/0014120 | A1 | * | 1/2007 | Kitamura ...................... 362/473 |
| 2009/0098963 | A1 | * | 4/2009 | Watarai et al. .................. 474/80 |

FOREIGN PATENT DOCUMENTS

| DE | 41 09 006 A1 | 9/1992 |
| JP | 8-175480 A | 7/1996 |

OTHER PUBLICATIONS

European Search Report of corresponding EP Application. No. 11 18 8302.1 dated Oct. 31, 2012.

* cited by examiner

*Primary Examiner* — Justin Holmes
(74) *Attorney, Agent, or Firm* — Global IP Counselors

(57) ABSTRACT

A motorized rear derailleur is basically provided with a base member, a movable member, a pulley arrangement, a motor unit and a power limit circuit. The movable member is movably mounted to the base member between a plurality of gear positions. The pulley arrangement is supported by the movable member. The pulley arrangement includes a pulley having a dynamo that generates electrical energy in response to rotation of the pulley. The motor unit is operatively coupled between the base member and the movable member to selectively move the movable member relative to the base member between the gear positions. The motor unit is electrically coupled to the dynamo to selectively receive electrical energy generated by the dynamo. The power limit circuit is electrically coupled between the dynamo and the motor unit.

16 Claims, 5 Drawing Sheets

REAR DERAILLEUR AND GEAR SHIFT SYSTEM

BACKGROUND

1. Field of the Invention

This invention generally relates to a motorized rear derailleur. More specifically, the present invention relates to a motorized rear derailleur that generates electrical energy.

2. Background Information

Recently, bicycles have been equipped with various electrical components to make riding easier and more enjoyable for the rider. Some bicycles are equipped with electrically controlled shifting systems. These electrically controlled shifting systems can be automatically operated based on bicycle riding conditions or can be manually operated by the rider as desired. Such electrically controlled shifting systems require electricity from a power source to operate. Some bicycles are provided with a battery as a power source for the electrical components. Some bicycles are provided with a wheel hub generator as a power source for the electrical components. In any case, an electrical power source is needed for bicycles equipped with various electrical components.

SUMMARY

One aspect presented in this disclosure is to provide a motorized rear derailleur that generates electrical energy for operating a motor of the rear derailleur.

In view of the state of the known technology, a motorized rear derailleur is provided that basically comprises a base member, a movable member, a pulley arrangement, a motor unit and a power limit circuit. The movable member is movably mounted to the base member between a plurality of gear positions. The pulley arrangement is supported by the movable member. The pulley arrangement includes a pulley having a dynamo that generates electrical energy in response to rotation of the pulley. The motor unit is operatively coupled between the base member and the movable member to selectively move the movable member relative to the base member between the gear positions. The motor unit is electrically coupled to the dynamo to selectively receive electrical energy generated by the dynamo. The power limit circuit is electrically coupled between the dynamo and the motor unit.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
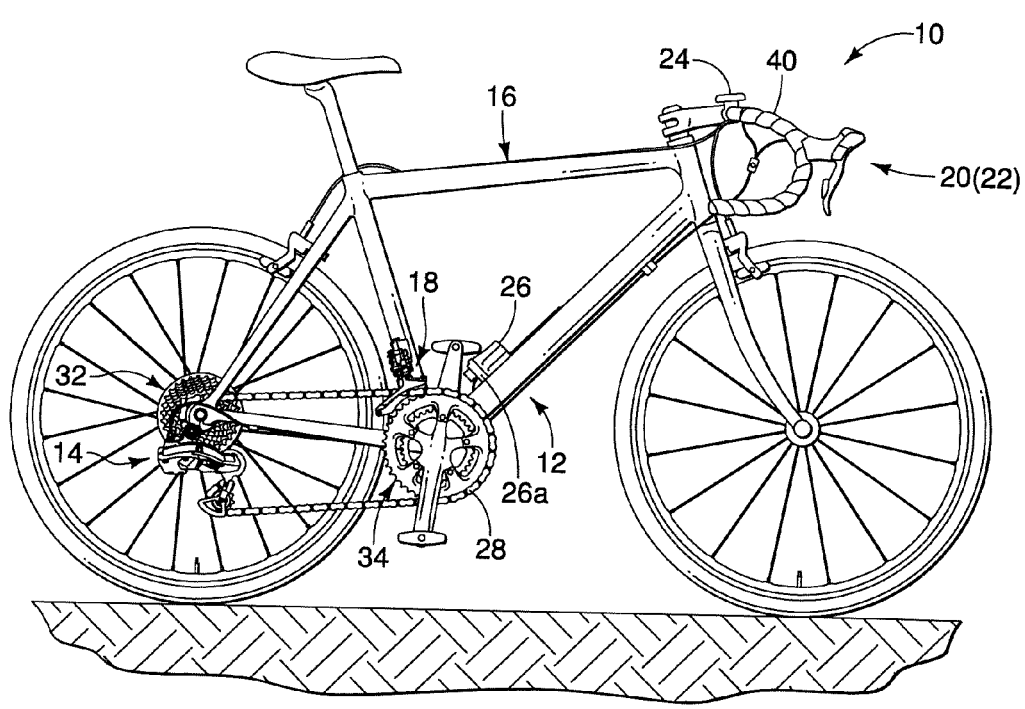
FIG. 1 is a side elevational view of a bicycle that is equipped with a gear shift system that includes a motorized rear derailleur that generates electrical power for electrical components of the bicycle in accordance with one illustrative embodiment.
Figure 2:
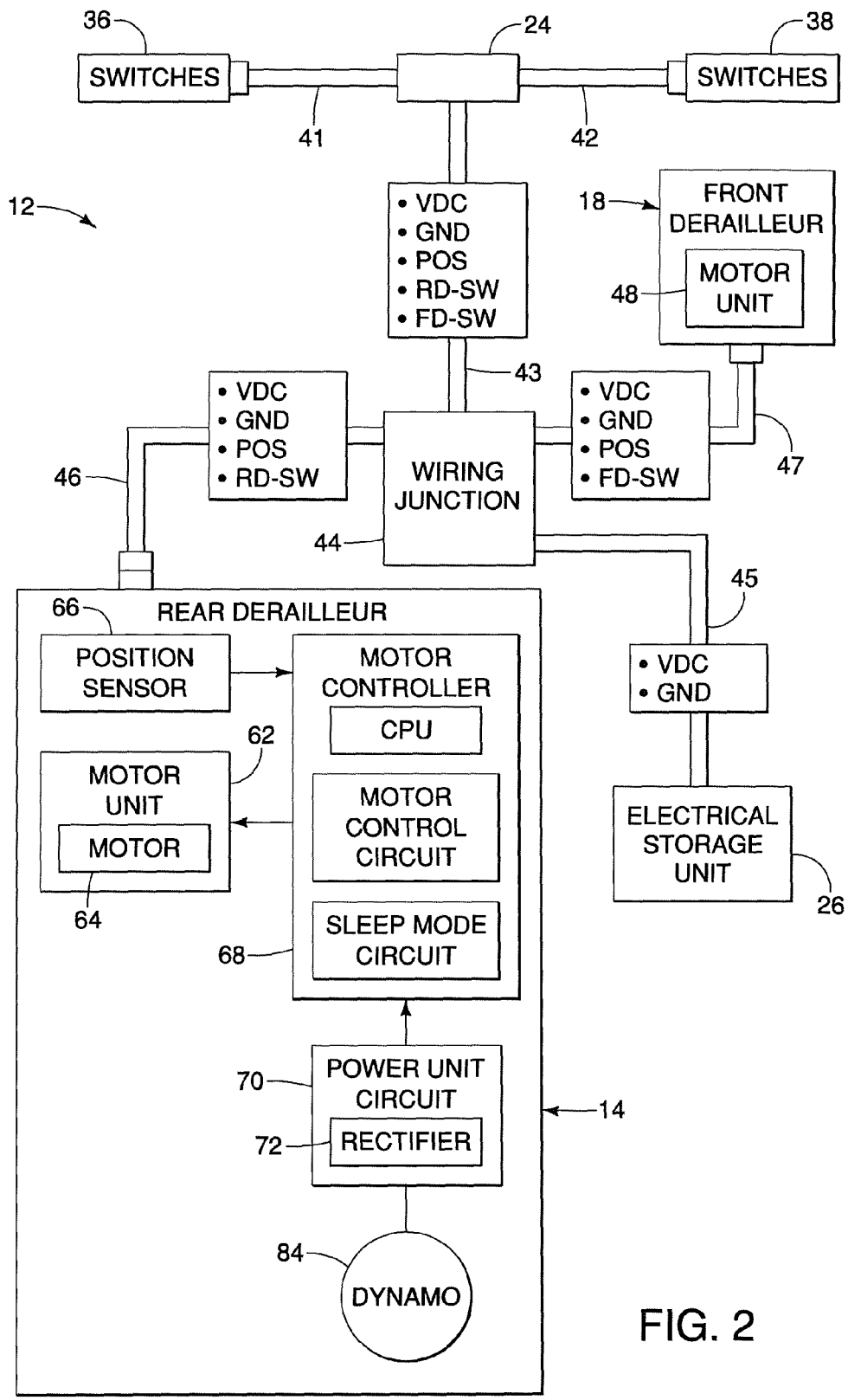
FIG. 2 is a schematic block diagram showing an entire configuration of the gear shift system of the bicycle illustrated in FIG. 1.

Referring initially to FIGS. 1 and 2, a bicycle 10 is illustrated that is equipped with a gear shift system 12 that includes, among other things, a motorized rear derailleur 14 accordance with one illustrated embodiment. The motorized rear derailleur 14 is mounted on a rear portion of a bicycle frame 16 of the bicycle 10. In addition to the motorized rear derailleur 14, as seen in FIG. 1, the gear shift system 12 further includes a motorized front derailleur 18, a pair of shifters 20 and 22, a computer unit 24 and an electrical storage unit 26. As explained below, the rear derailleur 14 generates electrical power for supplying electrical power to the electrical storage unit 26. The rear derailleur 14 is an electrically operated device, which receives stored electrical energy from the electrical storage unit 26 and/or receives electrical energy directly as it is generated by the rear derailleur 14.

The gear shift system 12 uses the rear derailleur 14 to shift a chain 28 between a plurality of rear sprockets 32, and uses the front derailleur 18 to shift a chain 28 between a plurality of front sprockets 34. Generally speaking, the shifting operations of the gear shift system 12 are conventional. Basically, the rider operates one or more electrical switches 36 provided on at least one of the shifters 20 and 22 for upshifting and downshifting the rear derailleur 14, and operates one or more electrical switches 38 provided on at least one of the shifters for upshifting and downshifting the front derailleur 18. More specifically, operation of the electrical switches 36 output a corresponding shift signal to the rear derailleur 14, while operation of the electrical switches 38 output a corresponding shift signal to the front derailleur 18.

In the illustrated embodiment, the shifters 20 and 22 are road style shifters that are mounted on a dropdown handlebar 40 as seen in FIG. 1. As illustrated, the electrical switches 36 and 38 constitute manually operated input devices (i.e., shift control members) that are mounted on the bracket of the shifters 20 and 22 and/or the brake lever of the shifters 20 and 22. However, the shifters 20 and 22 are not limited to road style shifters. Moreover, the electrical switches 36 and 38 can be mounted in locations that are separate from the brake levers. Preferably, the electrical switches 36 and 38 are mounted in an area that the rider can easily reach while riding such as on the handlebar 40 of the bicycle 10. While the electrical switches 36 and 38 are preferably mounted on the handlebar 40 of the bicycle 10, but could be mounted in other places as needed and/or desired. The electrical switches 36 and 38 selectively output switch signals to the derailleurs 14 and 18 to change a shift position of the derailleurs 14 and 18. The computer unit 24 is not necessary for the operation of the derailleurs 14 and 18. Since the shifters 20 and 22 and the electrical switches 36 and 38 are known structures, detailed descriptions of the shift control members 20 and 22 and the electrical switches 36 and 38 shall be omitted for the sake of brevity.

As seen in FIGS. 1 and 2, the gear shift system 12 is illustrated as a completely wired system in which each component is electrically connected by one or more electrical wires. However, some the components of the gear shift system 12 can be configured to communicate using wireless communications. As seen in FIG. 2, the electrical switches 36 and 38 are electrically connected to the computer unit 24 by electrical wires 41 and 42, respectively. An electrical wiring harness 43 electrically connects the computer unit 24 to a wiring junction 44. The wiring junction 44 is electrically connected to the electrical storage unit 26 by a power line 45, and is electrically connected to the rear derailleur 14 and the front derailleur 18 by wiring harnesses 46 and 47, respectively. Each of the wiring harnesses 43, 46 and 47 includes a power line for receive electrical power from the electrical storage unit 26 and the electrical power generated by the rear derailleur 14 as discussed below. In the illustrated embodiment, each of the wiring harnesses 43, 46 and 47 includes at least one derailleur position signal line for communicating a derailleur position signal from one of the derailleurs 14 and 18, and at least one shift switch signal line for communicating a shift switch signal from one of the electrical switches 36 and 38. In illustrated embodiment, each of the derailleurs 14 and 18 and the electrical switches 36 and 38 are connected by PLC (power line communication) technology to transmits/receives electrical signals and information signals via the power lines.

In the illustrated embodiment, as seen in FIG. 2, the derailleurs 14 and 18, the computer unit 24 and the electrical switches 36 and 38 are all electrically coupled to the electrical storage unit 26 for receiving electrical power there from. The rear derailleur 14 generates electricity that is supplied the electrical storage unit 26. However, the derailleurs 14 and 18, the computer unit 24 and the electrical switches 36 and 38 can each have a separate power supply (e.g., electrical storage unit) as needed and/or desired. In such a situation of a plurality of electrical storage units, the rear derailleur 14 generates electricity that can be supplied to one or more of the electrical storage units as needed and/or desired.

However, as mentioned above, the electrical switches 36 and 38 can be configured to send signals directly to the derailleurs 14 and 18, respectively, through wireless communications as needed and/or desired. When the electrical switches 36 and 38 send signals directly to the derailleurs 14 and 18 by wireless communications, the wires 41 and 42 and the wiring harness 43 can be eliminated. Also in such a case, the computer unit 24 can communicate wirelessly with the derailleurs 14 and 18 and/or the electrical switches 36 and 38 as needed and/or desired. Alternatively, the computer unit 24 can be eliminated. The term "signal" as used herein is not limited to an electrical signal, but includes other types of signals such as a command.

As seen in FIG. 1, the computer unit 24 is mounted to the handlebar 40 of the bicycle 10. The computer unit 24 is preferably a bicycle computer that measures, calculates and displays various riding parameters such as bicycle speed, distance traveled, pedaling speed, pedaling cadence etc. The computer unit 24 includes an attachment member to the handlebar 40 and a main body which is detachable the attachment member. The main body includes a microcomputer with control circuits having one or more CPUs, a storage unit (e.g., battery), memory units, computation units and the like. The microcomputer also includes software that outputs the predetermined parameters in accordance with the input signals outputted from the electrical switches 36 and 38 and other input devices (not shown).

As seen in FIG. 1, the front derailleur 18 is mounted to the frame 16 such that its chain guide is located above the front sprockets 34 with the chain 28 passing through its chain guide. In the illustrated embodiment, the front derailleur 18 includes an electric motor unit 48. The motor unit 48 can be a conventional component that basically includes an electric motor (not shown) with a gear reduction unit (not shown). The motor unit 48 preferable includes a position sensor (not shown). The position sensor of the motor unit 48 can be any type of position sensor such as, for example, a potentiometer or a hall effect sensor and magnet arrangement. The motor unit 48 is operated based on the switch signals from the electrical switches 38. The motor unit 48 is configured and arranged to move the chain guide of the front derailleur 18 laterally relative to the bicycle frame 16 for shifting the chain 28 between the front sprockets 34. The motor unit 48 receives electrical power from the electrical storage unit 26 in the illustrated embodiment. Since motorized front derailleurs are known structures, a detailed description of the front derailleur 18 shall be omitted for the sake of brevity.

The electrical storage unit 26 constitutes an electrical energy storage device or storage element that serves as a power source for the derailleurs 14 and 18, the computer unit 24 and the electrical switches 36 and 38. The electrical storage unit 26 can be, for example, formed of one or more accumulators, capacitors or batteries that are rechargeable. For example, the electrical storage unit 26 can be a nickel hydrogen battery, a lithium ion battery or a lithium ion capacitor that is rechargeable. The electrical storage unit 26 is removably mounted to the bicycle frame 16 (e.g., the down tube) by a holder 26a. The electrical storage unit 26 is electrically coupled to the derailleurs 14 and 18, the computer unit 24 and the electrical switches 36 and 38 via the wiring junction 44 that is mounted to the bicycle frame 16 (e.g., the hanger tube). Thus, the electrical storage unit 26 is configured to supply stored electrical energy to the derailleurs 14 and 18, the computer unit 24 and the electrical switches 36 and 38. In some cases, the attachment member of the computer unit 24 is electrical connected between the wiring junction 44 and the electrical switches 36 and 38 such that the electrical energy flows through the attachment member between the wiring junction 44 and the electrical switches 36 and 38. In such a case, the main body of computer unit 24 does not include an electrical storage unit. Rather, the main body of computer unit 24 is supplied the electrical energy through the attachment member of the computer unit 24.

Figure 3:
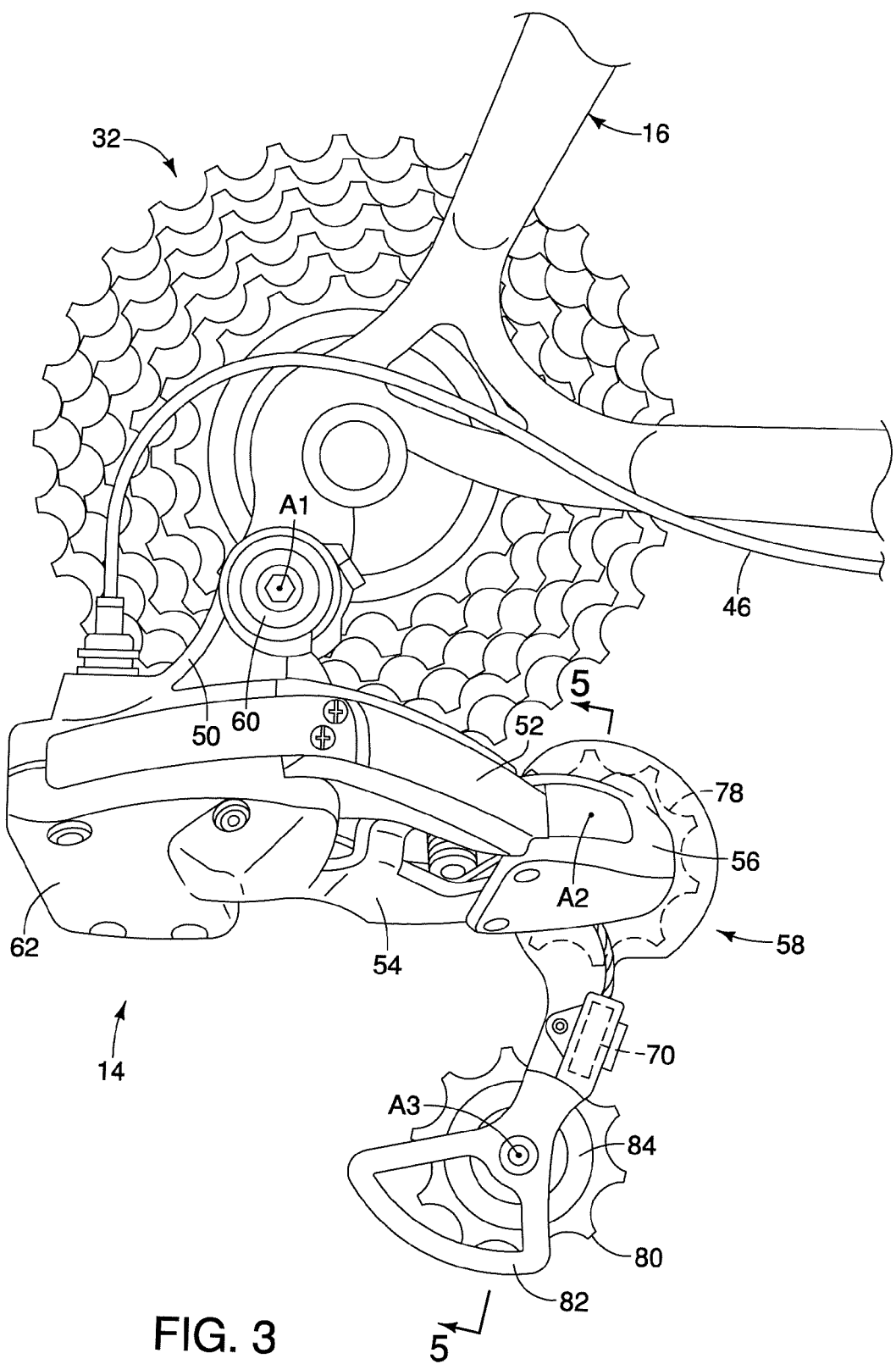
FIG. 3 is a side elevational view of a rear portion of the bicycle illustrated in FIG. 1 to show the motorized rear derailleur of the bicycle illustrated in FIG. 1.

Now, the motorized rear derailleur 14 will be discussed in more detail with respect to FIGS. 2 to 6. The basic electrical components of the motorized rear derailleur 14 are schematically illustrated in FIG. 2, while the basic mechanical of the motorized rear derailleur 14 are illustrated in FIG. 3 in a simplistic form. Turning first to FIG. 3, the motorized rear derailleur 14 basically includes a base member 50, a link member, a movable member 56 and a pulley arrangement 58. The link member includes an outer link 52 and an inner link 54. The base member 50 is fixedly mounted to the bicycle frame 16 (e.g., the derailleur hanger) by a frame attachment bolt 60 that defines a pivot axis A1. The frame attachment bolt 60 is threaded onto a threaded hole of the bicycle frame 16. The base member 50 preferably includes a biasing arrangement (not shown) that is operatively arranged between the base member 50 and the bicycle frame 16 in a conventional manner. The outer and inner links 52 and 54 are each pivotally mounted at a first end to the base member 50 and pivotally mounted at a second end to the movable member 56 to form a four-bar linkage. The pulley arrangement 58 is pivotally supported by the movable member 56. Thus, the movable member 56 is movably mounted to the base member 50 between a plurality of gear positions. As discussed below, the pulley arrangement 58 is configured to engage the chain 28 for shifting the chain 28 between the rear sprockets 32

The motorized rear derailleur 14 further includes an electric motor unit 62 that is fixedly mounted on the base member 50. The motor unit 62 has an output shaft operatively connected to at least one of the outer and inner links 52 and 54 for moving the outer and inner links 52 and 54 relative to the base member 50. As a result, the outer and inner links 52 and 54 move the movable member 56 relative to the base member 50 in a lateral direction of the bicycle frame 16. In other words, the motor unit 62 is operatively coupled between the base member 50 and the movable member 56 to selectively move the movable member 56 relative to the base member 50 between the gear positions. The motor unit 62 is operated based on the switch signals from the electrical switches 36. The motor unit 62 is configured and arranged to move the pulley arrangement 58 laterally relative to the bicycle frame 16 for shifting the chain 28 between the rear sprockets 32. The motor unit 62 receives electrical power from the electrical storage unit 26 and/or the pulley arrangement 58.

Referring again to FIG. 2, the motor unit 62 can be a conventional component that basically includes an electric motor 64 (not shown) with a gear reduction unit (not shown). The electric motor 64 is, e.g., a DC motor or a three-phase brushless DC motor with the gear reduction unit (not shown) on its output shaft. If an AC motor is used for the electric motor 64, then the motor unit 62 will typically include an inverter that converts DC current supplied to the electric motor unit 48 to an AC current for powering the electric motor 64.

As seen in FIG. 2, the motorized rear derailleur 14 further includes a position sensor 66 (e.g., a potentiometer or a hall effect sensor and magnet arrangement) that can be either a part of the motor unit 62 or a separate from the motor unit 62 as needed and/or desired. Preferably, the position sensor 66 is preferably coupled to a moving part of the gear reduction unit of the electric motor 64. The position sensor 66 provides a signal indicating a current position of moving part of the gear reduction unit such that the electric motor 64 can be operated to upshift and downshift the motorized rear derailleur 14 based on the switch signals from the electrical switches 36.

Still referring to FIG. 2, the motorized rear derailleur 14 further includes a motor controller 68. The motor controller 68 is electrically coupled to the electrical storage unit 26 to receive electrical energy stored in the electrical storage unit 26. The motor controller 68 can also receive electrical energy that is generated by the pulley arrangement 58 as explained below. The electric motor 64 is also operatively coupled to the motor controller 68 to operate in response to a control signal from the motor controller 68. Specifically, the motor controller 68 operates the electric motor 64 by controlling the supply of the electrical energy to the electric motor 64 based on the signal from the position sensor 66. The motor controller 68 includes, among other things, a central processing unit (CPU), a motor control circuit and a sleep mode control circuit and a motor driver. The sleep mode control circuit of the motor controller 68 places the motor control circuit in a sleep mode in response to an absence of velocity signal being present for a predetermined amount of time and activates the motor control circuit of the motor controller 68 from the sleep mode in response to a velocity signal being detected as explained below.

Also, as seen in FIG. 2, the motorized rear derailleur 14 further includes a power limit circuit 70 for regulating the electrical energy generated by the pulley arrangement 58 as explained below. In this illustrated embodiment, the power limit circuit 70 is provided with a rectifier circuit 72 for converting the alternating current (AC) produced by the pulley arrangement 58 to direct current (DC). The power limit circuit 70 can be a part of the motor controller 68 or can be a separate chip. As seen in FIG. 3, in this illustrated embodiment, a printed circuit board is mounted on the pulley arrangement 58 that includes the power limit circuit 70. The motor controller 68 is disposed on the base member 50 or inside of a case of motor unit 62. The power limit circuit 70 also can be disposed on the base member 50 or inside of a case of motor unit 62.

Figure 4:
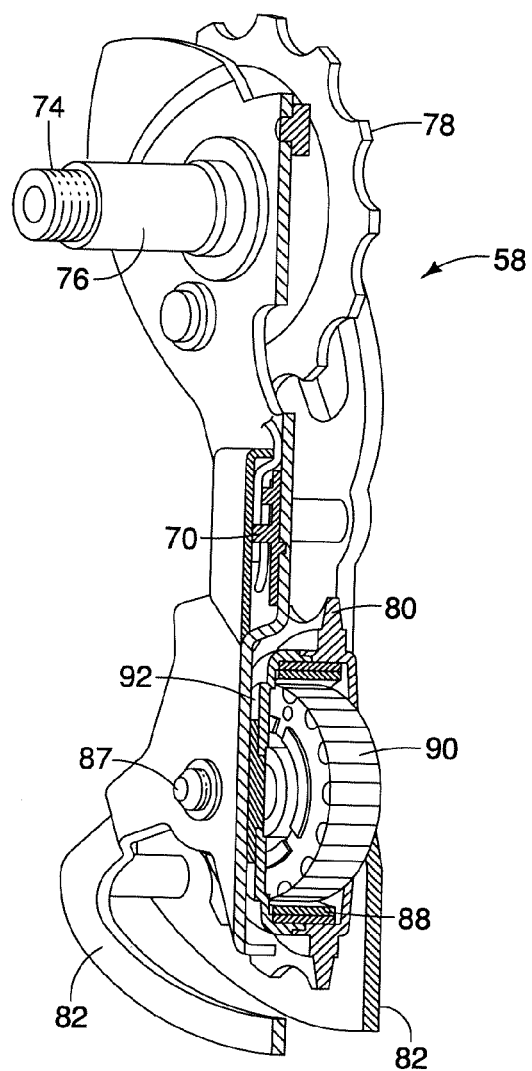
FIG. 4 is a perspective view of the motorized rear derailleur illustrated in FIGS. 1 and 3 with portions of the guide plates and the tension pulley broken away.
Figure 5:
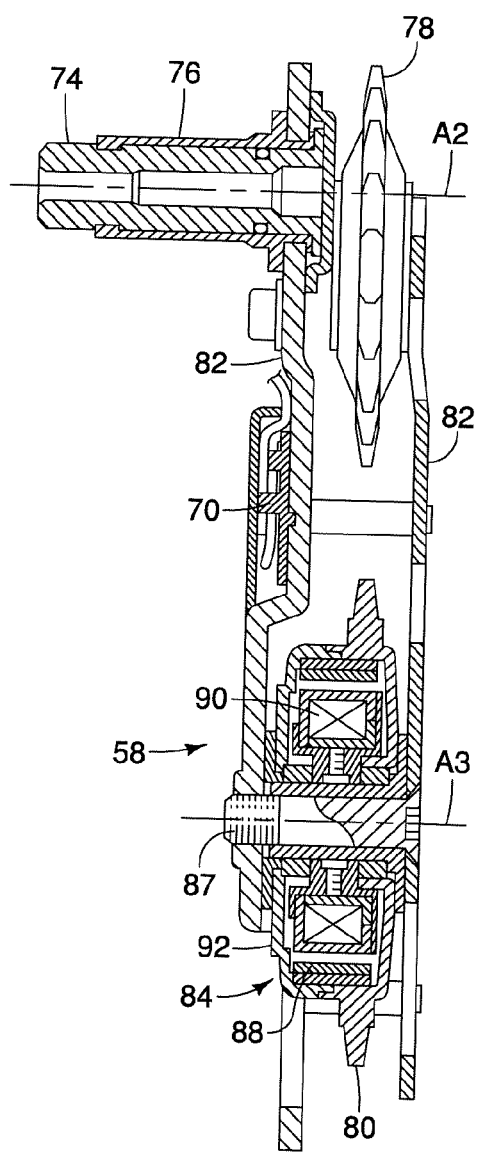
FIG. 5 is a cross sectional view of the motorized rear derailleur as seen along section line 5-5 of FIG. 3 with the guide pulley shown in full.

Referring now to FIGS. 4 and 5, the pulley arrangement 58 will now be explained in more detail. The pulley arrangement 58 is mounted to the movable member 56 by a mounting shaft 74 (e.g., a bolt or other suitable fastener). The mounting shaft 74 is provided with a bushing 76 such that the pulley arrangement 58 can pivot relative to the movable member 56 on the mounting shaft 74. The mounting shaft 74 defines a pivot axis A2 that is offset, but a parallel to the pivot axis A1 that is defined by the mounting bolt 60. A biasing arrangement (not shown) is operatively arranged between the movable member 56 and the pulley arrangement 58 in a conventional manner such that the pulley arrangement 58 is biased in a clockwise direction about the pivot axis A2 as view in FIG. 3.

Basically, as seen in FIGS. 4 and 5, the pulley arrangement 58 includes a guide pulley 78, a tension pulley 80 and a pair of chain guide plates 82. Each of the pulleys 78 and 80 includes a plurality of chain engagement teeth for engaging the bicycle chain 28. The chain guide plates 82 are located on opposite axial sides of the pulleys 78 and 80 to guide the chain 28 onto the pulleys 78 and 80. The pulleys 78 and 80 are rotatably mounted between the chain guide plates 82. Basically, the rear derailleur 14 generates electrical power using the chain 28 which rotates the tension pulley 80 and stores the electrical power in the electrical storage unit 26. In particular, the tension pulley 80 includes a dynamo 84 that generates electrical energy in response to the tension pulley 80 being rotated by the bicycle chain 28. The tension pulley 80 is rotatably mounted on a pivot shaft 87 that defines a rotational axis A3 for the dynamo 84. The pivot shaft 87 is fixed to one of the chain guide plates 82 such that the pivot shaft 87 is stationary with respect to the chain guide plates 82.

The dynamo 84 is electrically connected to the electrical storage unit 26 for supply electrical energy to the electrical storage unit 26 that was generated by the dynamo 84. The motor unit 62 is also electrically coupled to the dynamo 84 to receive electrical energy generated by the dynamo 84. A velocity signal is also generated by the dynamo 84. The velocity signal of the dynamo 84 is sent to the motor controller 68 for determining if the dynamo 84 is generating power or stopped. The power limit circuit 70 is electrically coupled between the dynamo 84 and the motor unit 62. The power limit circuit 70 is electrically coupled to the power lines of the wiring harnesses 45 and 46 that supply the stored electrical energy from the electrical storage unit 26 to the motor unit 62 via the wiring junction 44. In this way, the stored electrical energy is supplied from the electrical storage unit 26 to the motor unit 62. On the other hand, the electrical energy generated by the dynamo 84 is supplied to the motor unit 62 by a power line (schematically illustrated in FIG. 2) through the power limit circuit 70.

In illustrated embodiment, only the tension pulley 80 includes the dynamo 84. However, the guide pulley 78 can also be provided with a dynamo that is operated by the chain 28 to generate electrical energy as needed and/or desired. If the guide pulley 78 includes a dynamo, then the dynamo 84 in the tension pulley 80 could be eliminated if needed and/or desired.

Figure 6:
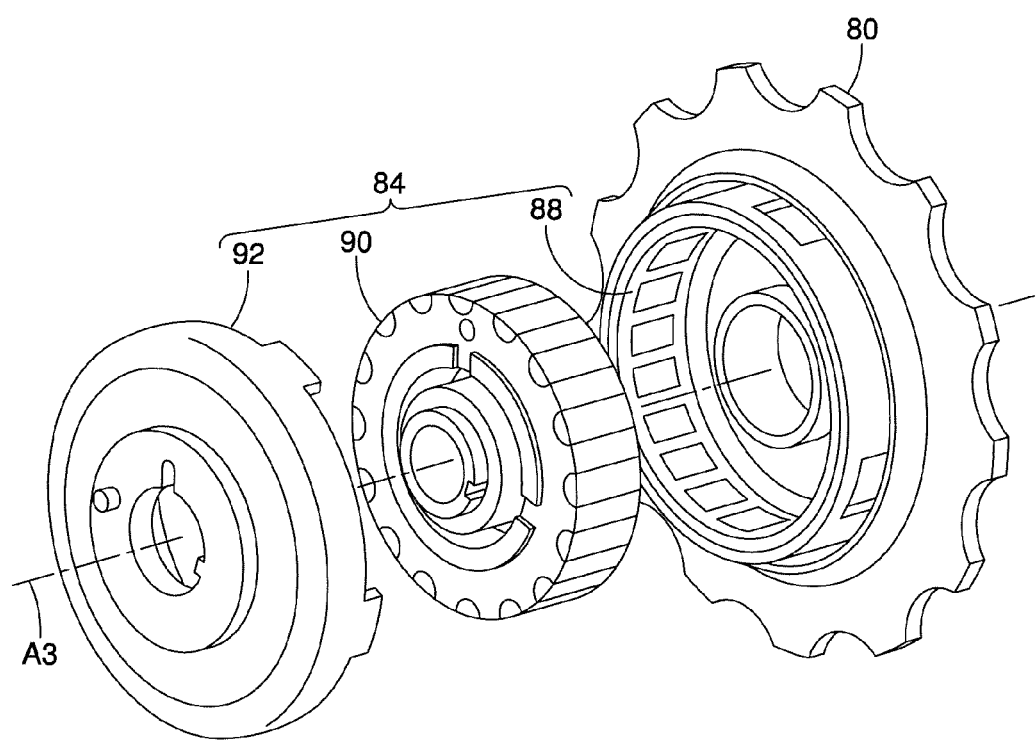
FIG. 6 is an exploded perspective view of the pulley of the motorized rear derailleur to illustrate the structure of the dynamo.

As seen in FIG. 6, the dynamo 84 basically includes a rotor 88, a stator 90 and a cover 92. The rotor 88 is fixed to the tension pulley 80 to rotate with the tension pulley 80. The stator 90 is non-rotatably mounted on the pivot shaft 87. The cover 92 is secured to the tension pulley 80 by a snap-fit connection. The rotor 88 and the stator 90 are disposed in the space configured by the cover 92 and the tension pulley 80. The rotor 88 has a plurality of permanent magnets for creating a constant magnetic field. The stator 90 has a plurality of armature windings to generate the electric current as the armature windings passes through the magnetic field of the permanent magnets on the rotor 88. Thus, the rotor 88 and the stator 90 form an electric generator that uses electromagnetic principles to convert mechanical energy (rotation of the tension pulley 80) to electrical energy (alternating current). In particular, the rotor 88 rotates around the stator 90 to generate electrical energy in response to the tension pulley 80 being rotated by the bicycle chain 28. In this illustrated embodiment, the rectifier circuit 72 converts the alternating current (AC) produced by the dynamo 84 to direct current (DC) for use by the various electrical components of the gear shift system 12 or for storage in the electrical storage unit 26.

In this illustrated embodiment, the motor controller 68 and the power limit circuit 70 are preferably configured such that the motor controller 68 detects the voltage of the electrical storage unit 26 while the motor controller 68 operates the electric motor 64. The power limit circuit 70 is arranged to limit a voltage value of the electrical energy being supplied to the electric motor 64 from the dynamo 84 such that the electrical energy is directly supplied to the electric motor 64 while the electrical energy generated by the dynamo 84 is at or above a prescribed level. The voltage value limited by the power limit circuit 70 is selected suitable value for the power lines 46 and 45 and the electrical storage unit 26. However, the electrical energy is supplied to the electric motor 64 from the electrical storage unit 26 while the electrical energy generated by the dynamo 84 is below the prescribed level. If the voltage of the electrical storage unit 26 is determined to be lower than a predetermined value as determined by the motor controller 68 and the electrical energy generated by the dynamo 84 is below the prescribed level, then the motor controller 68 does not operates the electric motor 64. Also the motor controller 68 preferably is configured to include a sleep mode, when the motor controller 68 does not receive a switch signal (upshift or downshift signal) from the switches 36 and 38 for predetermine time, then the motor controller 68 enters the sleep mode to conserve energy. The motor controller 68 also enters the sleep mode, when the motor controller 68 does not detect velocity signal that is outputted by the dynamo 84 for a predetermine time. In other word, if the tension pulley 80 does not move for a predetermine time, then the motor controller 68 enters a sleep mode. During the sleep mode, the motor controller 68 shuts down and stops monitoring the position sensor 66 and/or communicating with the computer unit 24 and/or one of the switches 36. Once the motor controller 68 receives a switch signal (upshift or downshift signal) from one of the switches 36, the switch signal is inputted to the motor controller 68 so the motor controller 68 can wake up. Also once the tension pulley 80 starts to rotate again, the velocity signal from the dynamo 84 is inputted to the motor controller 68 so the motor controller 68 can wake up quickly when the chain 28 is moved.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. In illustrated embodiment, the power limit circuit 70 are disposed on one of the chain guide plates 82. However, power limit circuit 70 may be disposed on the base member 50 or the motor unit 62.

Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A motorized rear derailleur comprising:
   a base member;
   a movable member movably mounted to the base member between a plurality of gear positions;
   a pulley arrangement supported by the movable member, the pulley arrangement including a pulley having a dynamo that generates electrical energy in response to rotation of the pulley;
   a motor unit including an electric motor and a motor controller operatively coupled to the electric motor to operate the electric motor, the motor unit being operatively coupled between the base member and the movable member to selectively move the movable member relative to the base member between the gear positions, the motor unit being electrically coupled to the dynamo to selectively receive electrical energy generated by the dynamo, and the motor controller including a motor control circuit and a sleep mode control circuit, the sleep mode control circuit placing the motor control circuit in a sleep mode in response to an absence of velocity signal being present for a predetermined amount of time and activating the motor control circuit from the sleep mode in response to a velocity signal being detected; and
   a power limit circuit electrically coupled between the dynamo and the motor unit.

2. The motorized rear derailleur according to claim 1, wherein
   the power limit circuit is arranged to limit a voltage value of the electrical energy being supplied to the electric motor from the dynamo such that the electrical energy is directly supplied to the electric motor while the electrical energy generated by the dynamo is at or above a prescribed level.

3. The motorized rear derailleur according to claim 1, wherein
the power limit circuit includes a rectifier circuit.

4. The motorized rear derailleur according to claim 1, wherein
the electrical energy is supplied to the electric motor from an electrical storage unit while the electrical energy generated by the dynamo is below the prescribed level.

5. The motorized rear derailleur according to claim 1, wherein
the velocity signal is generated by the dynamo.

6. The motorized rear derailleur according to claim 1, further comprising
an electrical storage unit electrically coupled to the dynamo to store electrical energy generated by the dynamo.

7. The motorized rear derailleur according to claim 6, wherein
the motor unit is electrically coupled to the electrical storage unit to receive stored electrical energy from the electrical storage unit.

8. The motorized rear derailleur according to claim 6, wherein
the power limit circuit is electrically coupled to a power line and supplies the stored electrical energy from the electrical storage unit to the motor unit such that the electrical energy generated by the dynamo is also supplied to the motor unit by the power line.

9. The motorized rear derailleur according to claim 1, further comprising
an electrical storage unit electrically coupled to the motor unit to supply stored electrical energy from the electrical storage unit to the motor unit.

10. The motorized rear derailleur according to claim 9, wherein
the power limit circuit is electrically coupled to a power line that supplies the stored electrical energy from the electrical storage unit to the motor unit such that the electrical energy generated by the dynamo is also supplied to the motor unit by the power line through the power limit circuit.

11. The motorized rear derailleur according to claim 9, wherein
the electrical storage unit is mounted on a holder that is remotely connected to the rear derailleur by a power line.

12. A gear shift system comprising:
a motorized rear derailleur;
a shift control member configured to output a shift signal to the motorized rear derailleur; and
an electrical storage unit electrically coupled the motorized rear derailleur to supply stored electrical energy to the motorized rear derailleur;
the motorized rear derailleur including
a base member,
a movable member movably mounted to the base member between a plurality of gear positions,
a pulley arrangement supported by the movable member, the pulley arrangement including a pulley having a dynamo that generates electrical energy in response to rotation of the pulley, the dynamo being electrically coupled to the electrical storage unit to store electrical energy generated by the dynamo in the electrical storage unit,
a motor unit including an electric motor and a motor controller operatively coupled to the electric motor to operate the electric motor, the motor unit being operatively coupled between the base member and the movable member to selectively move the movable member relative to the base member between the gear positions, the motor unit being electrically coupled to the dynamo to selectively receive electrical energy generated by the dynamo, the motor unit being electrically coupled to the electrical storage unit to selectively receive stored electrical energy from the electrical storage unit, and the motor controller including a motor control circuit and a sleep mode control circuit, the sleep mode control circuit placing the motor control circuit in a sleep mode in response to an absence of velocity signal being present for a predetermined amount of time and activating the motor control circuit from the sleep mode in response to a velocity signal being detected; and
a power limit circuit electrically coupled between the dynamo and the motor unit.

13. The gear shift system according to claim 12, wherein
the power limit circuit is arranged to limit a voltage value of the electrical energy being supplied to the electric motor from the dynamo such that the electrical energy is directly supplied to the electric motor while the electrical energy generated by the dynamo is at or above a prescribed level.

14. The gear shift system according to claim 12, wherein
the power limit circuit includes a rectifier circuit.

15. The gear shift system according to claim 12, wherein
the electrical energy is supplied to the electric motor from an electrical storage unit while the electrical energy generated by the dynamo is below the prescribed level.

16. The gear shift system according to claim 12, wherein
the velocity signal is generated by the dynamo.

* * * * *